Feb. 23, 1926.

M. G. BENJAMIN 1,574,548

METHOD AND APPARATUS FOR SWITCHING

Filed March 31, 1924    2 Sheets-Sheet 1

INVENTOR

Feb. 23, 1926.
M. G. BENJAMIN
1,574,548
METHOD AND APPARATUS FOR SWITCHING
Filed March 31, 1924   2 Sheets-Sheet 2
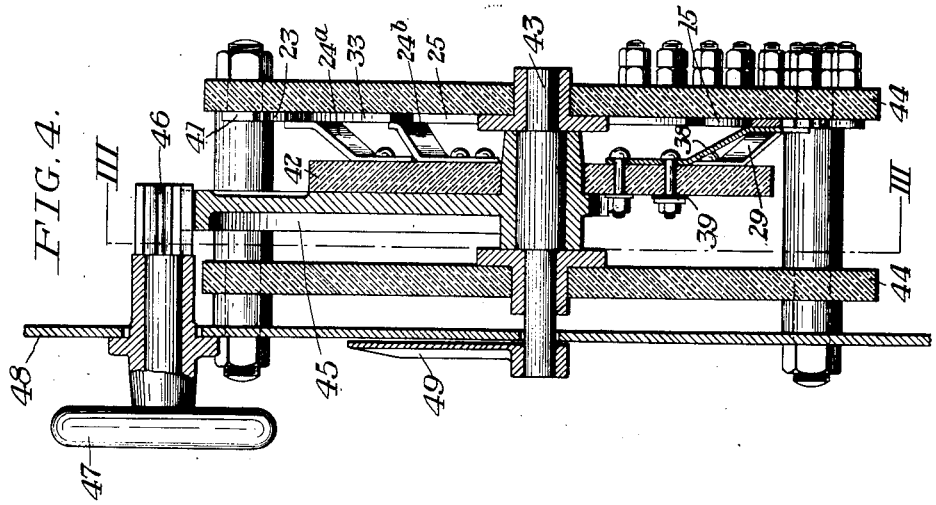
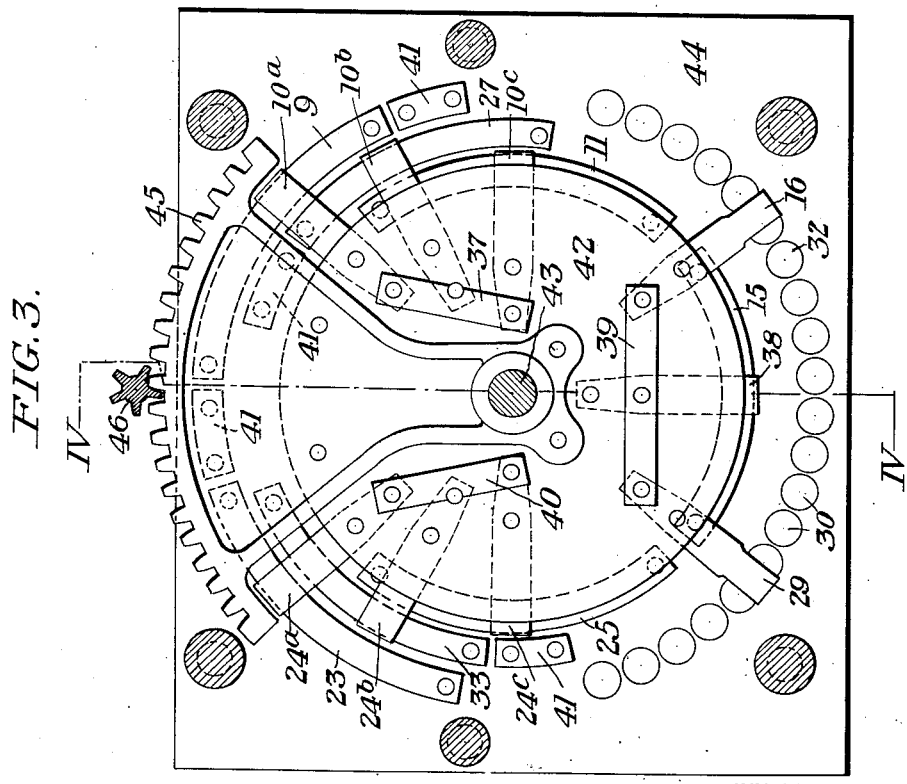
INVENTOR Patented Feb. 23, 1926.

1,574,548

UNITED STATES PATENT OFFICE.

MERRILL G. BENJAMIN, OF LAKEWOOD, OHIO.

METHOD AND APPARATUS FOR SWITCHING.

Application filed March 31, 1924. Serial No. 703,326.

*To all whom it may concern:*

Be it known that I, MERRILL G. BENJAMIN, a citizen of the United States, residing at Lakewood, county of Cuyahoga, and State of Ohio, have invented a new and useful Method and Apparatus for Switching, of which the following is a full, clear, and exact description.

This invention relates to method and apparatus for electric switching and is particularly applicable to the switching of an electrical power consuming device, such as the field of an electric motor, from one source of current to another.

In transferring the field of a motor from one current source to another, it is frequently highly desirable to effect the transfer without stopping the motor. For example, in my co-pending application Serial No. 703,324 filed March 31, 1924, there is shown a system of control for a battery of furnaces wherein the stokers and fans are driven by electric motors whose speeds are automatically controlled in accordance with a function of the battery, this control being effected by varying the field of a generator in accordance with a function of the battery and utilizing the output of the generator for supplying the fields of the stoker and fan motors. This control is entirely automatic and is more fully described in the above mentioned application, but it is frequently desirable to transfer one or more of the motors from the generator mains to the power mains of the plant, as when it is desired to remove a furnace from the battery and run it without its being subjected to the automatic control. Conversely it is sometimes desirable to switch a furnace from the manual control wherein the fields of the stoker and fan motors are supplied from the power mains to the automatic control wherein these fields are controlled from the generator mains. Under such circumstances it is obviously desirable for smooth operation to effect such transfer without stopping the fan or stoker motors.

I provide for making the transfer from one source of current to the other by connecting the second current source to the field while the first source is still connected thereto and supplying current in increasing amounts from the second source while decreasing the amount of current from the first source. It frequently happens that the two current sources are of different potentials and the change may be conveniently effected by providing a resistance through which the second source is connected to the motor field or other power consumption device and decreasing this resistance while supplying an increasing resistance between the first source and the motor field. In this manner the change is effected without stopping the motor, the only effect being a momentary slowing down of the same until the change is completed.

I also provide safety means in the armature circuit for throwing the motor entirely out of operation if it is attempted to start the same without current flowing to the field.

In the accompanying drawings, illustrating the preferred embodiment of my invention—

Figure 3 is a section on the line III—III of Figure 4, showing the transfer switch as actually constructed; and Figure 4 is a section on the line IV—IV of Figure 3.

Figure 1:
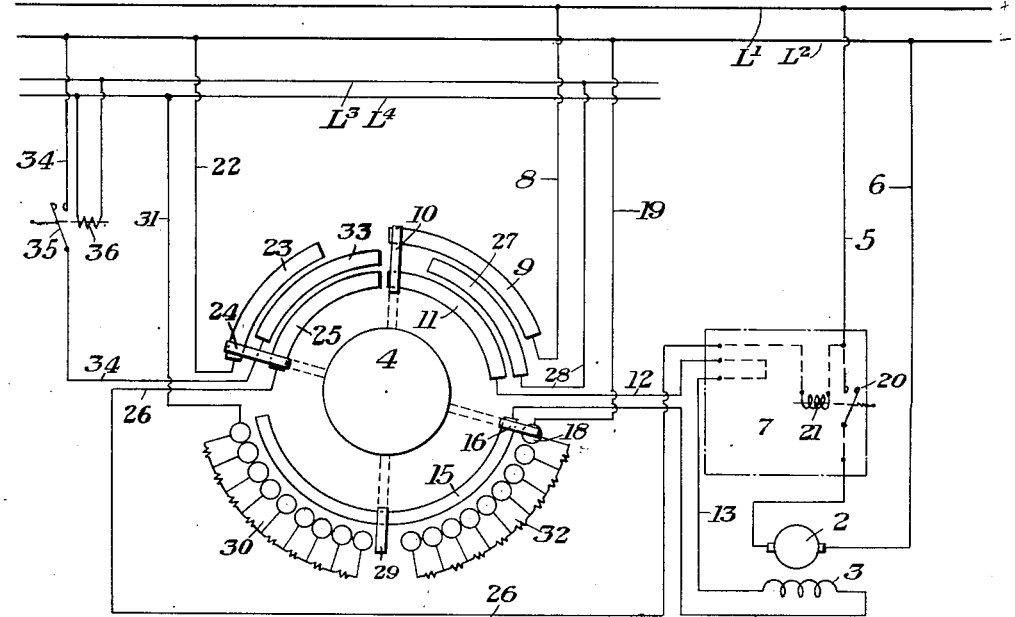
Figure 1 is a wiring diagram illustrative of the invention and showing the field of a motor connected to a power main from which the armature is also supplied with current.

In the illustrated embodiment of the invention there is shown a motor 2 having a field winding 3 controlled by a transfer switch, indicated generally by the reference character 4. It is the function of the transfer switch 4 to transfer the field 3 from the power mains $L^1$ and $L^2$, which may be the power mains for the entire plant, to a pair of mains $L^3$ and $L^4$, which may be supplied with current from a generator as above described, or vice versa.

Figure 1 shows the armature of the motor 2 connected to the mains $L^1$ and $L^2$ by wires 5 and 6, respectively, there being a suitable control panel 7 interposed in the wire 5. When the transfer switch 4 is in the position shown in Figure 1, current goes from the main $L^1$ through a wire 8 to a contact arc 9, then through a brush 10 to a contact arc 11. A wire 12 leads from this arc to the control panel 7, from which a wire 13 leads to the field 3. The return circuit is effected through a wire 14 leading to a contact arc 15, thence by a brush 16 to a contact point 18 from which a wire 19 leads back to the main L².

It will be noted that the control panel 7 includes a spring-opened switch 20 in the armature wire 5, this switch having a magnet 21 which is effective for holding the switch closed and completing the armature circuit. When the transfer switch 4 is in the position of Figure 1, current flows from the line L² through a wire 22 to a contact arc 23, thence by a brush 24, a contact arc 25, and a wire 26 to the magnet 21 from which the circuit is completed through the wire 5.

Figure 2:
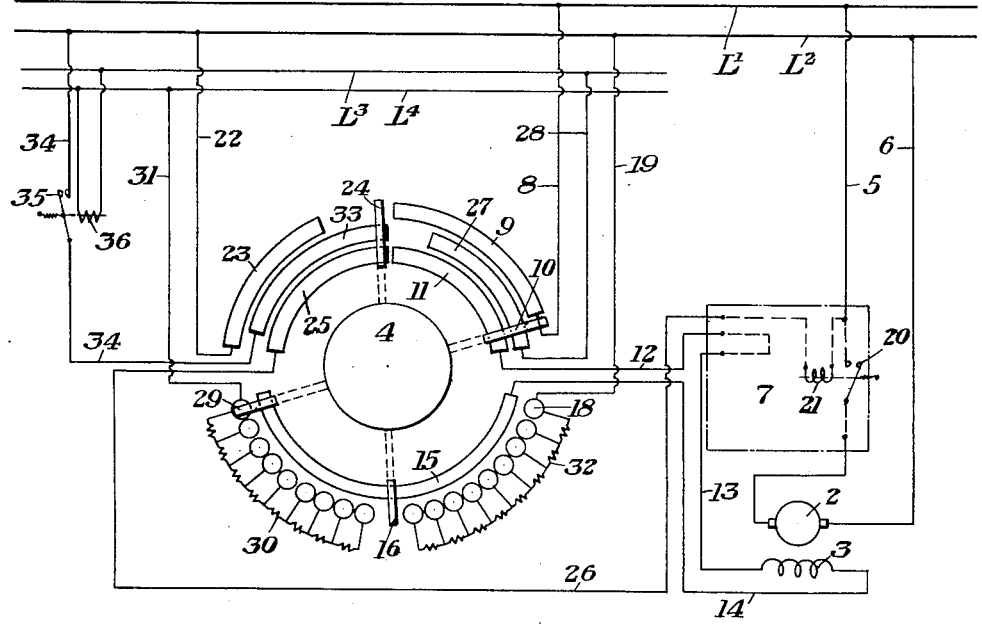
Figure 2 is a similar view, but showing the transfer switch moved to a position where the motor field is supplied with current from a second current source, such as a generator line, as above described.

When it is desired to transfer the field 3 from the line wires L¹ and L² to line wires L³ and L⁴, the transfer switch 4 is rotated clockwise until it assumes the position of Figure 2. As this change is effected a contact arc 27 connected to the wire L³ by a wire 28 makes contact with the brush 10 and current flows from the wire L³ through the wire 28, the arc 27, the brush 10, the arc 11 and the wires 12 and 13 to the field 3, thence by the wire 14 back to the arc 15. From the arc 15 current flows through a brush 29 and a rheostat 30 to a wire 31 leading to the line wire L⁴. It will be seen that as the switch is rotated to the position of Figure 2, the brush 16 is moved across the points of a rheostat 32 which cuts resistance in the field circuit from the current mains L¹ and L², while the rheostat 30 offers a large resistance to the field circuit from the mains L³ and L⁴ at first, this resistance being gradually decreased as the resistance in the other circuit is increased, until the final position of Figure 2 is reached, at which time the field is entirely disconnected from the mains L¹ and L² and all the resistance of the rheostat 30 is cut out of the field circuit from the mains L³ and L⁴.

During this movement of the transfer switch the brush 24 is moved out of contact with the arc 23 and into contact with an arc 33, while maintaining its contact with the arc 25 at all times. The arc 33 is connected to the main L² by a wire 34 having a switch 35 therein opened by a spring and having a magnet 36 effective for holding the switch in closed position. The magnet 36 is connected across the mains L³ and L⁴ so the switch 35 is held closed only so long as current is flowing in these mains. It will be seen that with the transfer switch in the position of Figure 2, the magnet 21 will only be in circuit when the switch 35 is closed and that, therefore, no current will flow to the armature of the motor 2 with the switch in this position unless current is flowing in the mains L³ and L⁴. This removes any possibility of the motor being burned up, since no current can be supplied to the armature until the field current is on.

Figures 3 and 4 show the practical embodiment of the switch 4 shown diagrammatically in Figures 1 and 2. It will be noted that the brush 10 is made in there separate units, 10ª, 10ᵇ and 10ᶜ, effective for making contact with the arcs 9, 27 and 11, respectively, and all connected together by a metal strip 37. Similarly, a supplemental contact 38 serves to make contact with the arc 15 and is connected to the brushes 16 and 29 by a metal strip 39, while the arcs 23, 33 and 25 are supplied with brushes 24ª, 24ᵇ and 24ᶜ, respectively, these being connected by a metal strip 40. This arrangement is preferred to a single brush since it insures better contact with the arcs. Suitable blocks 41 of insulated material serve to hold the brushes to proper height when they run out of contact with their respective arcs.

All the brushes are mounted on a circular piece of insulating material 42 which is rotatable on a shaft 43 carried in a frame 44. A gear segment 45 is secured to the insulating disk 42 and a pinion 46 having a handwheel 47 is provided for rotating the disk and attached contacts. Preferably the handwheel and pinion are of small size, so that it is practically impossible for an operator to actuate the transfer switch with any speed. By making these parts relatively small the transfer is effected slowly and no untoward condition arises, as might be the case if the disk were adjusted from one position to the other so rapidly that the motor had no time to adjust itself to changed conditions.

It will be seen that I provide for switching an electric power consuming device from one source of current to another by supplying current in increasing amounts from one source while decreasing the amount of current from the other source. Safety means are provided in the magnetically operated switch in the armature circuit and in the provision of the relatively small handwheel and pinion 4 operating the transfer switch.

While I have illustrated the preferred form of my invention, it will be understood that the invention is not limited thereto, but may be otherwise embodied within the scope of the following claims.

I claim:

1. The method of operating an electric motor, which includes supplying the motor armature from one current source, supplying the motor field from the same current source, switching the field to a second current source by supplying current in increasing amounts from the second source while decreasing the amount of current from the first source to the field, and maintaining the electrical connection between the first source and the motor armature, substantially as described.

2. The method of operating a current-consuming device having two circuits, which includes supplying one circuit from one current source, supplying the other circuit from the same current source, switching the second circuit to a second current source by supplying current in increasing amounts from the second current source while decreasing the amount of current supplied from the first source to the said circuit, and maintaining the electrical connection to the first circuit from the first source, substantially as described.

3. An electric motor and control means therefor, including an armature circuit from a current source, means for supplying the motor field from the same current source, means for switching the motor field to a second current source, and means operable from the second current source for maintaining the armature circuit, substantially as described.

4. Switching apparatus for a power-consuming device, having at least two circuits, including two rheostats each having a connection to a different source of power, a contactor for each rheostat, the contactors being spaced apart and each connected to the power-consuming device, means for moving the contactors over the rheostats, means whereby current from one source of power is made effective for maintaining connection between one circuit of the current consuming device and the other source of power, and means for limiting the speed of movement of the contacts, substantially as described.

5. Switching apparatus, including two rheostats each having a connection to a different source of power, a contactor for each rheostat the contactors being spaced apart and each connected to a power consuming device, means for moving the contactors over the rheostats, and means for limiting the speed of movement of the contactors, substantially as described.

6. Switching apparatus, including a pair of rheostats each connected to a different source of current, a brush for each rheostat connected to a common power consuming device, means for shifting the contactors over the rheostats to transfer the power consuming device from one source of current to another, a return line from the device, and a pair of contacts, one connected to each source of current, and adapted to connect with the return line to complete the circuit to the current source determined by the position of the rheostat contactors, substantially as described.

7. An electric motor and control means therefor, including an armature circuit from a current source, means for supplying the motor field from the same current source, means for switching the motor field to a second current source, and means for breaking the armature circuit when the motor field is connected to the second current source unless such source is alive, substantially as described.

In testimony whereof I have hereunto set my hand.

MERRILL G. BENJAMIN.